US008842792B2

(12) United States Patent
Jantunen et al.

(10) Patent No.: US 8,842,792 B2
(45) Date of Patent: Sep. 23, 2014

(54) METHOD AND APPARATUS FOR CLOSE PROXIMITY DEVICE DISCOVERY

(75) Inventors: Joni Jantunen, Helsinki (FI); Hannu Laine, Espoo (FI); Jari-Jukka Harald Kaaja, Jarvenpaa (FI); Jukka Reunamaki, Tampere (FI); Ilari Teikari, Helsinki (FI)

(73) Assignee: Nokia Corporation, Espoo (FI)

( * ) Notice: Subject to any disclaimer, the term of this patent is extended or adjusted under 35 U.S.C. 154(b) by 151 days.

(21) Appl. No.: 13/543,384

(22) Filed: Jul. 6, 2012

(65) Prior Publication Data
US 2013/0051507 A1 Feb. 28, 2013

(30) Foreign Application Priority Data

Aug. 30, 2011 (EP) .................................... 11179263

(51) Int. Cl.
*H04L 7/04* (2006.01)
*G06K 7/10* (2006.01)
(52) U.S. Cl.
CPC ........ *G06K 7/10039* (2013.01); *G06K 7/10306* (2013.01)
USPC ....................................................... 375/356
(58) Field of Classification Search
CPC .............. H04W 56/00; H04W 56/001; H04W 56/0025; H04W 56/0075
USPC .............. 370/350, 324, 395.62, 510
See application file for complete search history.

(56) References Cited

U.S. PATENT DOCUMENTS

| 6,946,951 B2 * | 9/2005 | Cole et al. .................... 340/10.1 |
| 2003/0151497 A1 | 8/2003 | Cole et al. |
| 2005/0237159 A1 | 10/2005 | Cooper et al. |

FOREIGN PATENT DOCUMENTS

| WO | WO0165712 | 9/2001 |
| WO | WO2009/086851 | * 7/2009 |
| WO | WO2009/115637 | * 9/2009 |
| WO | WO2009115637 | 9/2009 |

OTHER PUBLICATIONS

Extended European Search Report of European Patent Application No. EP11179263.6—Dated Feb. 22, 2012—6 pages.

* cited by examiner

*Primary Examiner* — Man Phan
*Assistant Examiner* — Mewale Ambaye
(74) *Attorney, Agent, or Firm* — Locke Lord LLP

(57) ABSTRACT

Method, apparatus and computer program for broadcasting a synchronization signal as a timing reference for slave devices; broadcasting by an impulse radio transceiver a discovery request packet with a given timing offset with relation to the timing reference, for reception by receptive slave devices with matching timing with the given timing offset; receiving by the impulse radio transceiver a response packet from each receptive slave device with the given timing offset; and detecting a timing conflict in which the impulse radio transceiver has simultaneously received two or more response packets, and responsively transmitting by the impulse radio transceiver to the receptive slave devices a response change request packet; the response change request packet requesting one or more of the receptive slave devices to cease sending response packets in response to a following discovery request packet sent with the given timing offset.

15 Claims, 4 Drawing Sheets

METHOD AND APPARATUS FOR CLOSE PROXIMITY DEVICE DISCOVERY

This application claims the benefit of European Patent Application No. 11179263.6, filed Aug. 30, 2011, which is hereby incorporated by reference.

TECHNICAL FIELD

The present application generally relates to close proximity device discovery.

BACKGROUND

Close proximity devices operate within a short range from a reader device. For example, radio-frequency identification (RFID) tags may be appended to various goods for wireless access with a reader device when in close proximity. As the RFID tags offer only relatively slow data transfer, there is ongoing development of faster technologies. For instance, RF memory tags are developed in which radio-frequency identification tags are accessed with very high data rates in comparison to the presently used RFID tags. These RF memory tags may be powered by a continuous wave radio signal at one set powering radio frequency (for example 13.56 MHz or 900 MHz) while data transfer is carried out using simple on-off keying on another set communication radio frequency.

The RF memory tags may be designed to operate over short distances in order to enable data rates in range of 100 times compared to those of the present RFID tags. As with the present RFID tags, the RF memory tags each may have a unique identifier for addressing by a reader device. On powering by the powering radio frequency signal, each of the RF memory tags gets a random timing with relation to the reader, due to the structure of the RF memory tags and due to varying radio propagation delay. Thanks to the short range, it is unlikely that two RF memory tags would get common timing with relation to the reader and thus there is no collision control to prevent RF memory tags from interfering each other's discovery by the reader.

SUMMARY

Various aspects of examples of the invention are set out in the claims.

According to a first example aspect of the present invention, there is provided an apparatus comprising:
  at least one memory comprising program code;
  one or more processors configured to execute the program code and accordingly to:
    cause a transmitter to broadcast a synchronization signal configured to provide a timing reference for slave devices;
    cause an impulse radio transceiver to broadcast a discovery request packet with a given timing offset with relation to the timing reference, for reception by receptive slave devices that have matching timing with the given timing offset;
    cause the impulse radio transceiver to receive a response packet from each receptive slave device with the given timing offset; and
    detect a timing conflict in which the impulse radio transceiver has simultaneously received two or more response packets, and to responsively cause the impulse radio transceiver to transmit to the receptive slave devices a response change request packet;
      the response change request packet being configured to request one or more of the receptive slave devices to cease sending response packets in response to a following discovery request packet sent with the given timing offset.

The response change request packet may be configured to request timing change from one or more of the receptive slave devices.

The response change request packet may comprise a qualifier configured to apply only for receptive slave devices that match with the qualifier. The response change request packet may be configured to request only such receptive slave devices to change timing that match with the qualifier. The qualifier may comprise an identity mask configured to cause slave devices matching with the mask to cease or continue sending of response packets.

The synchronization signal may be configured to energize the receptive slave devices.

The one or more processors may be further configured to test validity of received response packets with check sums to determine a timing conflict from a check sum error. The determination of the timing conflict may further involve detecting one or more radio pulses received by the impulse radio transceiver with the given timing offset.

The one or more processors may be configured to perform device discovery by varying the given timing offset so as to identify receptive slave devices with any of the successive time slots.

The slave devices may be capable of detecting radio impulses transmitted by the impulse radio transceiver only if received during a sensitivity period. The sensitivity period may last for Y periods of the synchronization signal. Y may be 1, 2, or a fraction of one period. The sensitivity of the slave devices during the sensitivity period may be variable.

The impulse radio transceiver may be configured to operate with slave devices that are within 10 cm.

The impulse radio transceiver may be configured to receive radio impulses from the slave devices only during sensitivity periods of the impulse radio transceiver.

The one or more processors may be further configured to cause the impulse radio transceiver to broadcast a mute command to cause an identified receptive slave device to become non-responsive to a future discovery request packet.

The one or more processors may be further configured to cause the impulse radio transceiver to broadcast a mute command to cause arbitrary receptive slave device to become non-responsive to a future discovery request packet.

The one or more processors may be further configured to cause slave devices to cease being non-responsive by causing the impulse radio transceiver to send a mute termination message. Alternatively, or additionally, the mute command may cause the receptive slave devices to become non-responsive only for a given period of time and/or given number of subsequent discovery request packets.

According to a second example aspect of the present invention there is provided an apparatus comprising
  at least one memory comprising program code;
  one or more processors configured to execute the program code and accordingly to:
    cause a receiver to receive a synchronization signal from a proximate transmitter unit, and to obtain a timing reference from the synchronization signal;
    cause an impulse radio transceiver to receive from the transmitter unit a discovery request packet with a given timing offset with relation to the timing reference, cause the impulse radio transceiver to transmit to the transmitter unit a response packet with the given timing offset; and cause the impulse radio transceiver to receive from the transmitter unit a response change request packet, and responsively to receiving of the response change request packet, to abstain from sending a response packet in response to a following discovery request packet received from the transmitter unit with the given timing offset.

According to a third example aspect of the present invention there is provided a method comprising:

causing a transmitter to broadcast a synchronization signal configured to provide a timing reference for slave devices;

causing an impulse radio transceiver to broadcast a discovery request packet with a given timing offset with relation to the timing reference, for reception by receptive slave devices that have matching timing with the given timing offset;

causing the impulse radio transceiver to receive a response packet from each receptive slave device with the given timing offset; and detecting a timing conflict in which the impulse radio transceiver has simultaneously received two or more response packets, and responsively causing the impulse radio transceiver to transmit to the receptive slave devices a response change request packet;

the response change request packet being configured to request one or more of the receptive slave devices to cease sending response packets in response to a following discovery request packet sent with the given timing offset.

According to a fourth example aspect of the present invention there is provided a method comprising:

broadcasting a synchronization signal configured to provide a timing reference for slave devices;

broadcasting by an impulse radio transceiver a discovery request packet with a given timing offset with relation to the timing reference, for reception by receptive slave devices that have matching timing with the given timing offset;

receiving by the impulse radio transceiver a response packet from each receptive slave device with the given timing offset; and detecting a timing conflict in which the impulse radio transceiver has simultaneously received two or more response packets, and responsively transmitting by the impulse radio transceiver to the receptive slave devices a response change request packet;

the response change request packet being configured to request one or more of the receptive slave devices to cease sending response packets in response to a following discovery request packet sent with the given timing offset.

According to a fifth example aspect of the present invention there is provided a method comprising:

causing a receiver to receive a synchronization signal from a proximate transmitter unit, and to obtain a timing reference from the synchronization signal;

causing an impulse radio transceiver to receive from the transmitter unit a discovery request packet with a given timing offset with relation to the timing reference, causing the impulse radio transceiver to transmit to the transmitter unit a response packet with the given timing offset; and cause the receiver to receive from the transmitter unit a response change request packet, and responsively to receiving of the response change request packet, to abstain from sending a response packet in response to a following discovery request packet received from the transmitter unit with the given timing offset.

According to a sixth example aspect of the present invention there is provided a method comprising:

receiving a synchronization signal from a proximate transmitter unit, and obtaining a timing reference from the synchronization;

receiving by an impulse radio transceiver from the transmitter unit a discovery request packet with a given timing offset with relation to the timing reference, transmitting by the impulse radio transceiver to the transmitter unit a response packet with the given timing offset; and receiving by the impulse radio transceiver from the transmitter unit a response change request packet, and responsively to receiving of the response change request packet, abstaining from sending a response packet in response to a following discovery request packet received from the transmitter unit with the given timing offset.

According to a seventh example aspect of the present invention there is provided a computer program comprising computer executable program code configured to cause an apparatus, when executing the program code, to perform the method of any one of the third to sixth example aspect.

According to an eighth example aspect of the present invention there is provided a computer program comprising computer executable program code configured to cause an apparatus, when executing the program code, to perform the method of the fourth example aspect.

According to a ninth example aspect of the present invention there is provided a computer readable memory medium comprising the computer program of the fifth example aspect.

The mobile communication device may be a mobile telephone.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Device discovery procedure is generally used for instance to discover radio frequency identity tags according to a set of requests. Device discovery is also needed for finding proximate RF memory tags or so-called embedded tags (etags). Generally, the discovery procedure covers two low layer procedures, namely device discovery and capability discovery. The device discovery is performed when a host or a reader desires to find out identities of previously unknown tags within common radio range.

Typically, the device discovery or scanning is performed periodically if there is no active connection to another device. The host may request media access control (MAC) layer to resolve tag type and capabilities of the tags found during the device discovery. The MAC may also conclude that no tag devices are within the range, when none is found in the device discovery.

Figure 1:
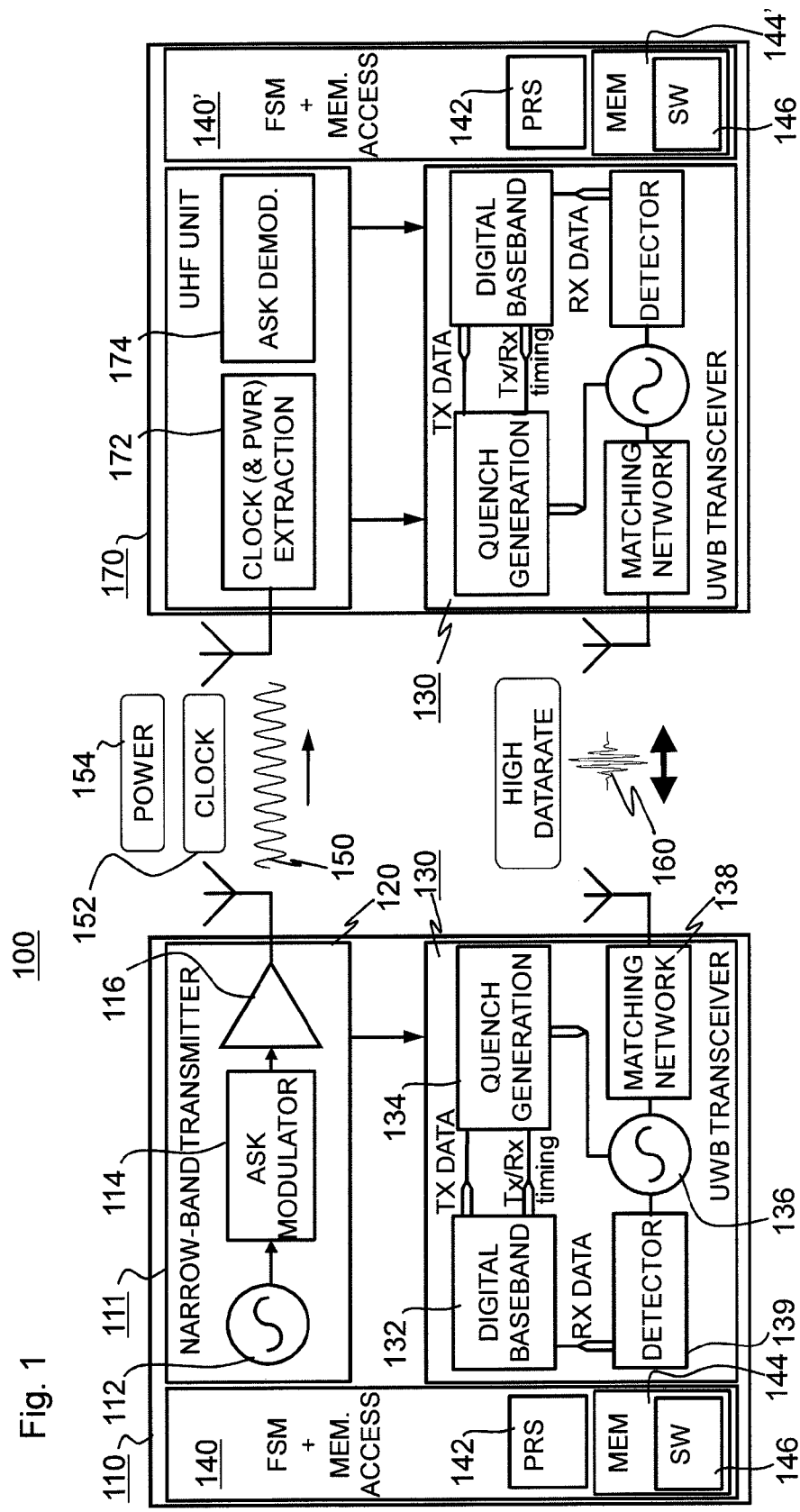
FIG. 1 shows a schematic drawing of a system according to an example embodiment of the invention.

FIG. 1 shows a schematic drawing of a system 100 according to an example embodiment of the invention. The system 100 comprises an impulse ultra-wide band (I-UWB) transmitter unit 110 that in this embodiment is also capable of receiving information. The transmitter unit 110 comprises two radio branches. A narrow band transmitter 111 operates as a first branch for transmitting a narrow band signal 150 to provide a synchronization signal 152 and optionally also power 154 to a receiver unit 170 (also termed as a slave device). An impulse radio transceiver such as an ultra-wide band (UWB) transceiver 130 operates as a second branch for transferring information as ultra-wide band signals 160 or as a UWB link with high data rate to and from the slave device 170. The impulse radio transceiver is embodied in FIG. 1 as an integral transmitter—receiver unit, but it shall be appreciated that this term should cover any implementation according to other example embodiments in which the same function is provided with two or more separate physical elements (e.g. separate UWB transmitter and UWB receiver).

The narrow band transmitter comprises a first oscillator 112 optionally connected to an amplitude shift keying (ASK) modulator 114, and a power amplifier 116 for producing the narrow band signal 150. The ASK (or FSK or PSK as in other example embodiments) modulation of the narrow-band signal 150 is not mandatory for using the UWB link. However, ASK modulation on the narrow band signal 150 is provided in some example embodiments for enabling backward compatible interoperation with old RFID systems.

The ultra-wide band (UWB) transceiver 130 comprises for high data rate transmission of information, in series, a digital base band circuitry 132, a quench generator 134, a second oscillator 136 with an input connected to a quench signal source 114, and a matching network for antenna connection. For high data rate reception of information, the ultra-wide band (UWB) transceiver 130 further comprises a detector 139 configured to detect symbols received coinciding with a radio reception sensitivity period.

A finite state machine (FSM) and memory access circuitry 140 controls the general operation of the transmitter unit 110. The finite state machine and memory access circuitry 140 comprises in this embodiment a processor 142 and a memory 144 storing program code 146 for the processor 142. The program code 146 is configured to cause the processor to control the operation of the transmitter unit 110. The processor 142 may be a central processing unit or a digital signal processor. However, for implementing cost-effective and small devices, the processor may be, for instance, a field programmable gate array (FPGA). The FSM and memory access circuitry may also be implemented as an integrated circuit.

The quench signal source 134 may be configured to operate as a pulse generator that has a transmission sequence input and a reception sequence input. Either or both of these inputs may be configured to receive suitably formed sequences such as pulse width modulated (PWM) or on/off keyed (OOK) digital signals to indicate desired transmission and/or reception periods during which the second oscillator 136 will be activated. The quench signal source 134 is configured to produce quench signals according to received inputs and to provide correspondingly quench signals which technology as such is well known.

The slave device 170 of FIG. 1 also has an ultra-wide band transceiver 130, possibly identical with that of the transmitter unit 110. The slave device also has a finite state machine (FSM) and memory access circuitry 140' for controlling the general operation of the slave device 170 that may only differ from the corresponding circuitry 140 of the transmitter unit 110 by the program code 146' being configured to cause operation suited for a slave device 170.

In one example embodiment, the narrow band signal 150 has a frequency in the range of 860 MHz to 960 MHz or 13.65 MHz. The frequency of the narrow band signal 150 is determined by the first oscillator 112. The bandwidth of the narrow band signal depends on embodiment and may be e.g. 50 KHz to 1 MHz. The synchronization signal 152 provides a timing reference for proximate slave devices that are within the range of the transmitter unit 110 and that have an ultra-wide band communication range covering the transmitter unit 110, i.e. that have common communication range with the transmitter unit 110. The timing reference provides a resolution of one period, of the synchronization signal, referred herein as an elementary time unit, ETU. For instance, if the frequency of the synchronization signal 152 is 900 MHz, 1 ETU=1.1 ns.

The second oscillator correspondingly sets the frequency of the ultra-wide band signal 160, for instance, to 7.9 GHz.

In an example embodiment, the modulation of the ultra-wide band signal 160 is on-off keying (OOK) modulation with one pulse per symbol, and every symbol is divided into X ETUs. For example: X=64 and ETU~1.1 ns=>14.2 Msymbols/second or 14.2 Mbps when one bit is represented by one symbol. In other words, a pulse repetition period (PRP) or a radio frame lasts X ETUs, wherein X is, for instance, 8, 16, 32 or 64. The radio frame can be also divided into slots where one slot lasts for example 16 ETUs and thus one PRP equals to four slots (still assuming that X is 64). One given slot of the frame is used by one tag for transmitting (or receiving) a pulse. A symbol is represented by X successive pulses. Each pulse lasts for at least one ETU. In this example embodiment, one pulse extends over two or more ETUs. Thus, the transmitter unit 110 can send pulses to test a given timing offset (e.g. 0 to 63 ETUs from starting of the PRP), which the slave device 170 receives after a pulse transfer delay that is caused e.g. by radio propagation delay and signal processing delays. The response pulses from the slave device 170 are sent with another pulse transfer delay. Let us assume that the pulses and the sensitivity periods each cover two ETUs and the slave device is constructed to advance its transmissions that much that if the slave device is touching the transmission device, the tail of a pulse from sent by the slave device is detected by the transmitter unit 110 in one pulse. When such a slave device is distanced to a range matching with radio propagation delay of one ETU, the response pulses become delayed by two ETUs (down- and uplinks combined), but still the response pulses co-inside with one ETU within the reception sensitivity period of the transmitter unit 110. Thus, the slave device can reside anywhere within the range corresponding to radio propagation during one ETU i.e. some 33 cm in case of 900 MHz synchronization signal 152.

A skilled person appreciates that in addition to the elements shown in FIG. 1, the transmitter unit 110 comprises in some example embodiments other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 110 comprises in an example embodiment a disposable or rechargeable battery (not shown) for powering the apparatus 110 when external power if external power supply is not available. Moreover, the implementation of various elements can be adapted to the desired application. For instance, any processor and/or memory can be construed with one or more logical or physical elements. Likewise, the slave device 170 may comprise any or all of the other elements listed in this paragraph or elsewhere in this document.

It is recalled that the synchronization signal 152 provides the timing reference for ultra-wide band signal 160, but the timing reference leaves uncertainty of the phase of the PRP (i.e. the ETU within one PRP) in the present example. Hence, the phase or timing offset between the reader 110 and a proximate tags 170 is a random number between 0 to X−1 times ETU. While this offset is normally not an integer, for the purpose of simplification, the timing offset refers in one example embodiment to an integer number between 0 and X−1 ETUs.

It is worthwhile expressly noting here that under some circumstances the transmitter unit 110 may also operate as a slave device 170 or the slave device 170 may operate as the transmitter unit, provided that the necessary circuitries for the other functionality are present.

The system 100 may be usable in radio frequency identity applications in which a slave device 170 is electrified by the radio transmission, as in FIG. 1. Alternatively, the slave device has its own power supply and the narrow band signal 150 is merely providing a synchronization signal (=timing reference) 152 for the slave device 170.

The system 100 presented in FIG. 1 may be used, for instance, in low-power applications such as the RFID. The transmitter unit 110 may also be referred to as a reader. The slave devices may be referred to as tags.

Figure 2:
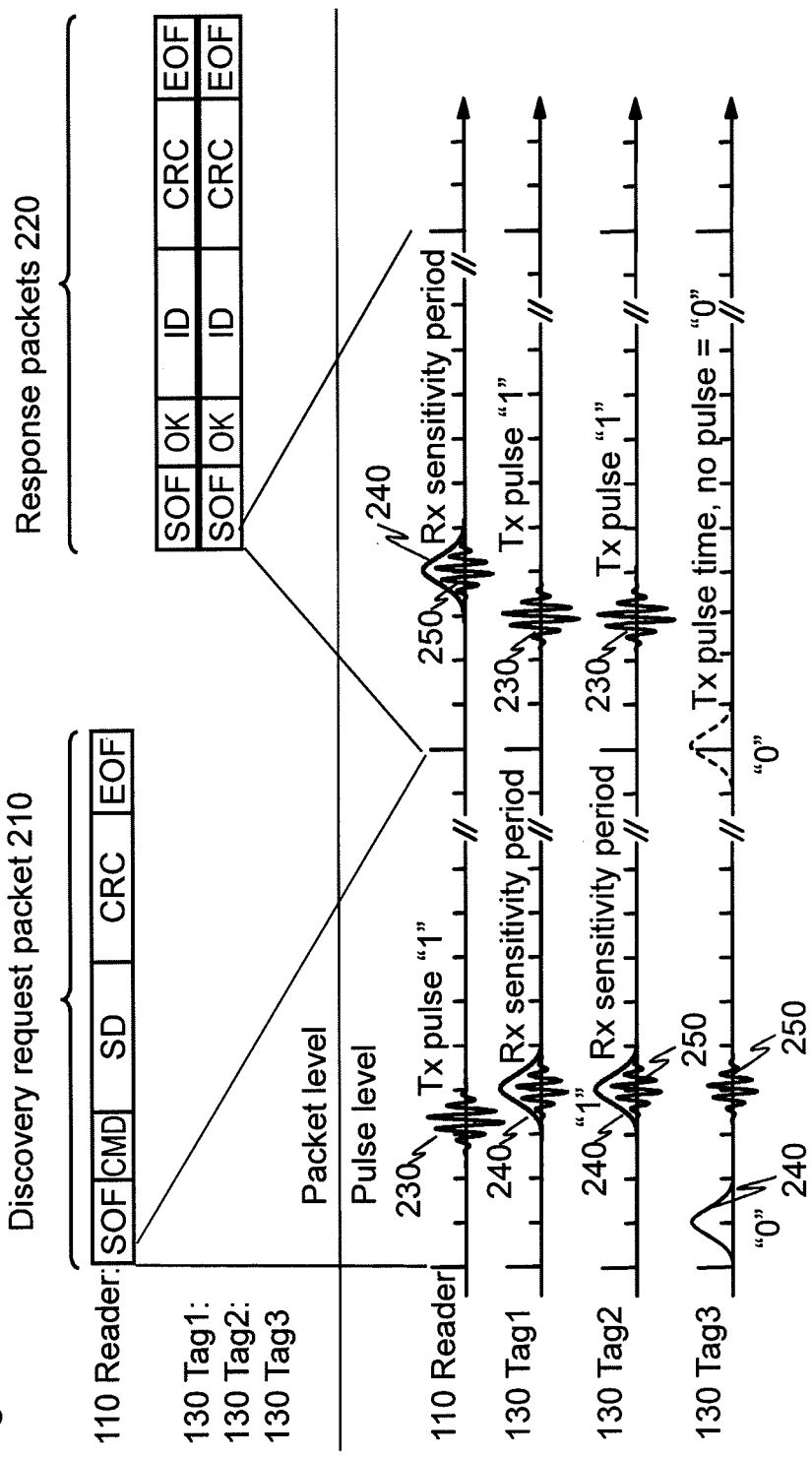
FIG. 2 shows a schematic drawing of particular data exchanged between the reader and proximate tags according to an example embodiment.

For communicating with slave devices or tags 170, the transmitter unit or reader 110 has to first identify receptive slave devices i.e. devices with which communication is possible (proximate enough and in a ready state for communication). A sufficiently proximate tag 170 has a common range with the reader 110, i.e. such a tag 170 is able to receive the synchronization signal 152 and to communicate with the reader 110 with its ultra-wide band transceiver 130. To this end, the reader 110 first performs an interrogation of proximate tags 170 and after that engages to communications. The interrogation comprises a device discovery process that is illustrated by FIG. 2 that shows a schematic drawing of particular data exchanged between the reader 110 and proximate tags 170. While not shown in FIG. 2, the tags 170 become aware of a commencing discovery process when the reader 110 starts to transmit the narrow-band signal 150. FIG. 2 shows some data packets exploded into their elements down to individual radio pulses in the ultra-wide band signal 160.

After ramp-up of the synchronization signal 152 has a continuous wave (CW) period in which the amplitude of the synchronization signal 152 stays high enough for providing a timing reference for proximate tags, here for tags 1 to 3. In the interrogation period, the reader communicates with timing bound to cyclic radio frames consisting of a plurality of successive ETUs i.e. possible radio pulse transmission periods.

FIG. 2 illustrates operation according to one example embodiment on packet level and on pulse level. On the pulse level, there are time lines for operation of the reader 110, Tag1, Tag2, And Tag3. These three tags are each receptive, and Tag1 and Tag2 share common timing with respect to the transmissions of the reader 110. In sake of simplicity, let us also assume that each of the three tags is proximately equidistant with respect to the reader 110, say 10 cm away from the reader 110.

In FIG. 2, there are shown TX pulses 230 sent by the reader 110 and by tags 130. The air propagation delay, antenna and circuitry delays postpone the arrival of the sent TX pulses 230 so that the arrival of the pulses 250 on a recipient (tag 130 or reader 110) appears slightly offset to the right-hand side direction. Further, FIG. 2 shows reception sensitivity periods 240. The time line of FIG. 2 is discontinuous on the pulse level so that all the pulses forming the discovery request packet 210 have been first sent by the reader 110 before the response packet 220 pulses are being sent to the reader 110.

On the packet level side, there are shown a discovery request packet 210 that is sent by the reader 110 and received by two of the tags 110, labeled in FIG. 2 as Tag1 and Tag2. The discovery request packet 210 has as subsequent fields a start of frame, a command (discovery request), the supplementary data (SD) (such as identity of the reader 110, identity of the tag 110, or a qualifier) a cyclic redundancy code (as a check sum), and an end of frame field. The incoming pulses 250 are slightly attenuated and hence they are drawn with a smaller amplitude. The Tag3 has a mismatching timing as its reception sensitivity periods 240 are not sufficiently aligned with incoming pulses 250 corresponding to the discovery request packet 210. Hence, Tag3 does not transmit pulses 230 to the reader 110. Tag1 and Tag2, instead, have matching timing i.e. the pulses 230 sent by the reader arrive aligned in time with the reception sensitivity periods 240. Hence, these two tags 130 do detect the incoming pulses 250 and they receive the discovery request packet 210. After correctly receiving the discovery request packet 210, the Tag1 and Tag2 respond each by sending the response packet 220. The response packet 220 comprises a start of field, ok, identity of the tag, check sum and end of frame fields. Notably, in an example embodiment, the tags do not send not ok response packets to avoid collisions of response packets arriving at the reader 110.

The reader 110 then receives the two response packets 220 that cause a collision, because the identity (ID) and check sum (CRC16, for example) fields of the two packets are different. The on-off keying used in the wide band signal 160 causes that a "1" symbol (pulse sent) will override a "0" symbol (pulse not sent) as the receiver will only receive a pulse. Two "1" symbols will also appear as a "1" as the ultra-wide band transceiver 1 lacks resolution to distinguish one received pulse from two pulses. Hence, the varying parts of the response packet 220 become jammed such that check sum fails when checking against other bits of the response packet 220.

Figure 3:
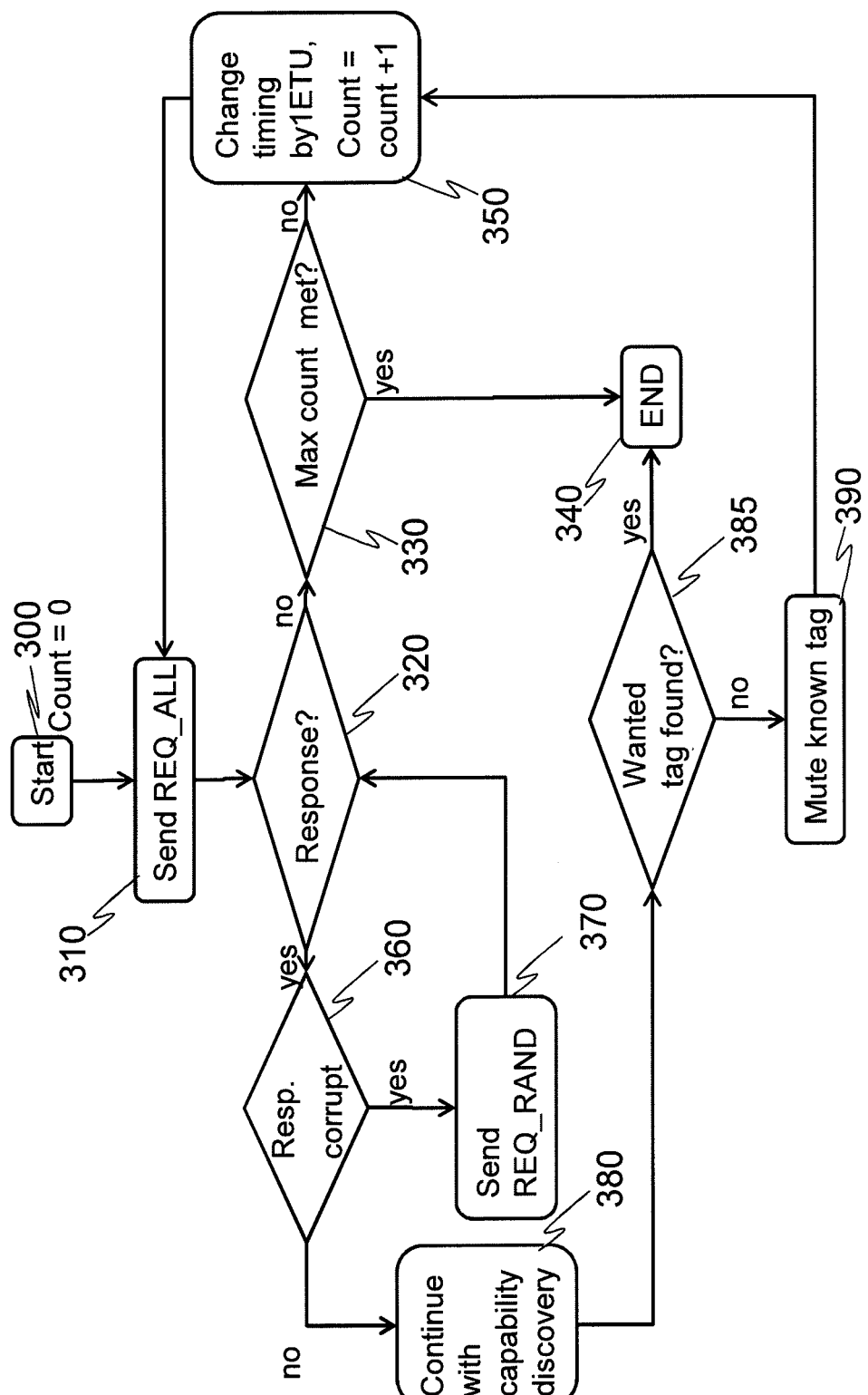
FIG. 3 illustrates a process of a reader according to an example embodiment of the invention for resolving collisions of the response packets in device discovery.

FIG. 3 illustrates a process of a reader 110 according to an example embodiment of the invention for resolving collisions of the response packets 220 in device discovery. The process starts 300 when a device discovery is desired, for instance, automatically on expiry of a timer or in response to an event of an application, service or request of a user. A counter is reset to value 0.

The reader 110 then broadcasts 310 an unqualified discovery request packet 210 (request all). Next, the reader 110 checks 320 whether any response was received. If no, the reader 110 checks 330 whether a maximum count was met and if yes, the process comes to end 340, otherwise the reader 110 changes the timing e.g. by 1 ETU and increments the counter by one for keeping track of the different timing offsets that have been tested, step 350. Returning to the checking 320 of any response, if yes, the process branches to step 360 in which it is tested whether the received response was corrupted (using the CRC of the received response packet 220). If yes, the reader 110 sends 370 a response change request packet. The response change request packet may take different forms depending on embodiments, but in FIG. 3 the response change request packet (REQ_RAND in step 370) defines a condition for random or pseudorandom testing that is intended to cause some of the receptive slaves 170 to change timing. After sending of the response change request packet, the process resumes to step 320 for checking if any response is received following the response change request packet. This is so because in this example embodiment, the response change request packet has two effects: 1) to drive some slaves 170 away to a different timing offset, and 2) to renew the discover request for any slave(s) 170 that do not change to different timing offset.

If the response packet 220 tested OK in step 360, the process continues to step 380, where capability discovery is carried out for checking what capabilities the found slave 170 has. Next, it is checked 385 whether a wanted tag was found and if yes, the discovery process ends 340, otherwise a mute command is sent 390 to the newly discovered tag 170. This mute command is issued to keep the discovered tag unresponsive to following discovery request packets 210, in case that a conflict of tags 170 with some subsequently tested timing offset would result in one or more tags 170 changing to the present timing offset. Thus, if the discovery process is renewed, the newly found tag will not send a response packet 220 and will not interfere with the discovery of such newcomers to the presently tested timing offset. The mute command is, in some example embodiments, configure to define one or more mute release events for terminating of muting. After step 390, the reader 110 resumes to step 350.

In another example embodiment, step 370 also sets a retry counter and step 340 first checks the retry flag. If the retry flag is set, then instead of ending, the retry flag is unset and the process jumps back to the start 300. This example embodiment tries to identify slaves 170 that had changed timing in step 370 to a timing offset (ETU value) that had already been tested. However, in order to avoid entering into a non-ending loop, there a cycle counter may be incremented each time the process resumes from the end 340 to the start 300 and the resuming be stopped once the cycle counter meets a pre-set maximum, such as 1, 2 or 3. Then, the cycle counter should be cleared.

Figure 4A:
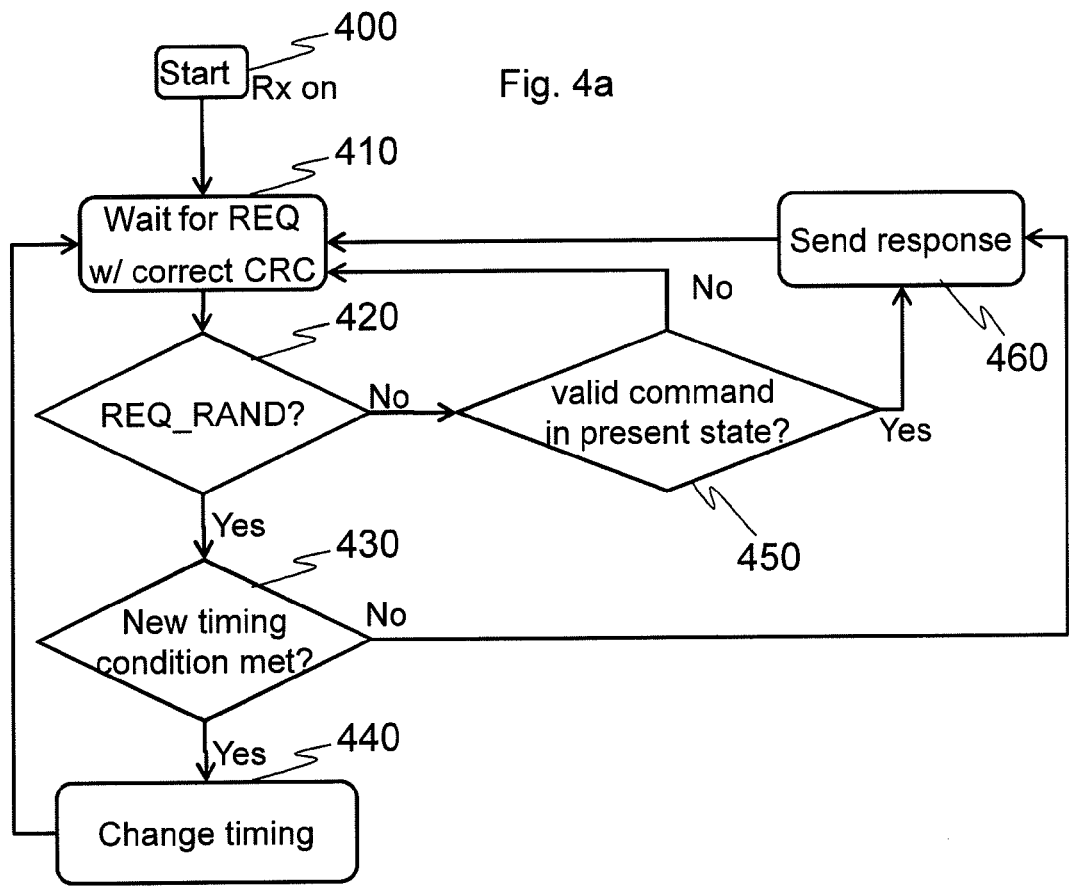
FIG. 4a shows a process in a tag according to an example embodiment of the invention during device discovery.

FIG. 4a shows a process in a tag 170 according to an example embodiment of the invention during device discovery. The process starts in step 400 by switching on the ultra-wide band transceiver 130 of the tag 170. Then, the tag 170 waits 410 for a discovery request packet 210. Then, the tag 170 checks whether the received discovery request packet 210 had a request rand with the qualifier (e.g. in field SD shown in FIG. 2) therein. If no, the process branches to step 450, otherwise the process continues to determine 430 whether a new timing condition is met, i.e. whether the timing should be changed. If yes, the process advances to step 440 wherein the tag 170 changes its timing and resumes to step 410 to wait for a discovery request packet 210 corresponding to the renewed timing. Otherwise, the process jumps to sending a response packet 220 in step 460 and then resumes to step 410.

Step 450 involves checking whether the discovery request packet 210 was valid for the tag 170 in its present state. For instance, if the tag 170 was previously muted, then the tag 170 should not send any response and the process should resume to step 410, otherwise the process continues to step 460 for sending the response packet 220 and then resuming to step 420.

Figure 4B:
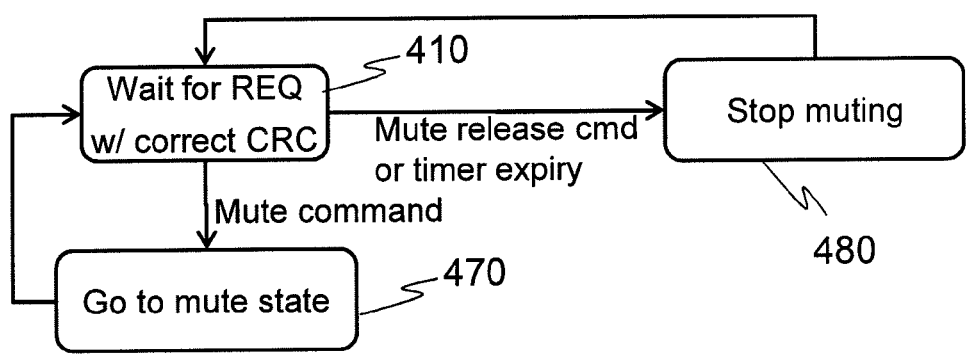
FIG. 4b shows a further process in the tag that runs in parallel with that illustrated in FIG. 4a, according to an example embodiment.

FIG. 4b shows a further process in the tag 170 that runs in parallel with that illustrated in FIG. 4a, according to an example embodiment. While waiting for the discovery request packet 210, the tag 170 further monitors for mute commands and mute release events. If a mute command is received (see step 390 of FIG. 3), the tag 170 goes into mute state so that thereafter, the determination in step 450 will result in resuming to step 410 rather than sending a response packet 220 in step 460. On the other hand, if the tag 170 determines a mute release event such as receiving of a mute release command or expiring of a timer set on when going to mute state, the tag 170 stops muting and resumes to step 410. In one example embodiment, the tag 170 switches off its ultra-wide band transceiver 130. Thus, power can be saved and no requests and commands are detected nor responded to while the tag 170 is muted.

As receptive collision-incurring tags that receive the response change request change their timing offsets independently (or according to a pre-defined condition), the possibility that the resulting timing is equal for two tags is small.

The predefined condition may be based on a random selection and/or to an ID condition qualifying which of the tags should change their timing.

FIGS. 3 and 4 illustrate the use of a random selection. A REQ_RAND command may have qualifiers to request every tag (or a subset of tags) to draw new timing for themselves. There may also be a qualifier defining the range for the new timing. For example the new timing can be set (+/−) 8 to 16 ETU off from the present timing A parameter field sets in one example embodiment a condition that defines tags 170 that should draw new timing by their IDs, for example:

Only the tags with the LSB='1' of ID (least significant bit) are requested to change the timing;

Only the tags 170 below (or above) a certain ID value are requested to change the timing;

Only the tags 170 fulfilling a certain ID mask are requested to change the timing;

Tags 170 belonging to a particular group (VIP, certain high priority group, group of with certain privacy rules, empty/full, commerce group etc.), should remain unchanged so that their discovery would be faster than that of the others.

In one example embodiment, different parameters are given for a multicast group in contention, for matching tags 170 to draw a new timing offset value within the same evasion period such as 0-15 ETU off present timing offset. This evasion period can be partitioned to subparts for different multicast groups, e.g. 0 to 7 and 8 to 15 ETUs or 0 to 3 and 4 to 15 ETUs.

For example, receptive tags 170 can be requested to draw new timing offsets between 0-15 ETUs (Elementary Time Units), which can be same or at max 15 ETU forward. The time forward is randomly drawn, which helps to separate tags with a common session ID (used for device discovery). Each tag with the common session ID gets different timing parameters.

If the total number of possible timing offsets is for example 64, there should be free timing offsets (due to drawn time 0-15 ETUs forward).

To prevent collision due to the new drawn timing matching the timing of already discovered tag, muting of already discovered tags before continuing discovery procedure with a subsequent discovery round helps to avoid new collisions. Additionally, the REQ_RAND command of one example embodiment can solve some fully jammed situation (where there is a collision in all timing offsets).

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising: at least one processor; at least one memory including executable instructions, the at least one memory and the executable instructions being configured to, in cooperation with the at least one processor, cause the apparatus to perform at least the following: broadcast a synchronization signal configured to provide a timing reference for slave devices; broadcast a discovery request packet with a given timing offset with relation to the timing reference, for reception by receptive slave devices having matching timing with the given timing offset; receive a response packet from each receptive slave device with the given timing offset; and detect a timing conflict in which the apparatus has simultaneously received two or more response packets, and to responsively cause the apparatus to transmit to the receptive slave devices a response change request packet, wherein the response change request packet is configured to request one or more of the receptive slave devices to cease sending response packets in response to a following discovery request packet sent with the given timing offset, and to change a timing offset for sending a response packet, wherein the synchronization signal is configured to energize the receptive slave devices, and wherein the at least one memory and the executable instructions are further configured to, in cooperation with the at least one processor, cause the apparatus to test validity of received response packets with check sums to determine a timing conflict from a check sum error.

2. The apparatus of claim 1, wherein the at least one memory and the executable instructions are further configured to, in cooperation with the at least one processor, cause the apparatus to perform device discovery by varying the given timing offset so as to identify receptive slave devices with any of the successive timing offsets.

3. The apparatus of claim 1, wherein the at least one memory and the executable instructions are further configured to, in cooperation with the at least one processor, cause the apparatus to broadcast a mute command to cause an identified receptive slave device to become non-responsive to a future discovery request packet.

4. An apparatus comprising: at least one processor; at least one memory including executable instructions, the at least one memory and the executable instructions being configured to, in cooperation with the at least one processor, cause least the following: receive a synchronization signal from a proximate transmitter unit, and to obtain a timing reference from the synchronization signal; receive from the transmitter unit a discovery request packet with a given timing offset with relation to the timing reference, transmit to the transmitter unit a response packet with the given timing offset; and receive from the transmitter unit a response change request packet, and responsively to receiving of the response change request packet, to abstain from sending a response packet in response to a following discovery request packet received from the transmitter unit with the given timing offset, and to change a timing offset for sending a response packet, wherein the synchronization signal is configured to energize the apparatus, and wherein the transmitter unit is configured to test validity of received response packets with check sums to determine a timing conflict from a check sum error.

5. The apparatus of claim 4, wherein the apparatus is configured to detect radio impulses only if received during a sensitivity period of the apparatus.

6. A method comprising: broadcasting, by an apparatus, a synchronization signal configured to provide a timing reference for slave devices; broadcasting, by the apparatus, a discovery request packet with a given timing offset with relation to the timing reference, for reception by receptive slave devices that have matching timing with the given timing offset; receiving, by the apparatus, a response packet from each receptive slave device with the given timing offset; detecting a timing conflict in which the apparatus has simultaneously received two or more response packets, and responsively transmitting to the receptive slave devices a response change request packet; and testing validity of received response packets with check sums to determine a timing conflict from a check sum error, wherein the response change request packet is configured to request one or more of the receptive slave devices to cease sending response packets in response to a following discovery request packet sent with the given timing offset, and to change a timing offset for sending a response packet, and wherein the synchronization signal is configured to energize the receptive slave devices.

7. The method of claim 6, further comprising performing device discovery by varying the given timing offset so as to identify receptive slave devices with any of the successive timing offsets.

8. The apparatus of claim 6, further comprising broadcasting a mute command to cause an identified receptive slave device to become non-responsive to a future discovery request packet.

9. A method comprising: receiving, by an apparatus, a synchronization signal from a proximate transmitter unit, and to obtain a timing reference from the synchronization signal; receiving, by the apparatus, from the transmitter unit a discovery request packet with a given timing offset with relation to the timing reference, transmitting, by the apparatus, to the transmitter unit a response packet with the given timing offset; and receiving, by the apparatus, from the transmitter unit a response change request packet, and responsively to receiving of the response change request packet, abstaining from sending a response packet in response to a following discovery request packet received from the transmitter unit with the given timing offset, and changing a timing offset for sending a response packet, wherein the synchronization signal is configured to energize the apparatus, and wherein the transmitter unit is configured to test validity of received response packets with check sums to determine a timing conflict from a check sum error.

10. The method of claim 9, wherein the apparatus is configured to detect radio impulses only if received during a sensitivity period of the apparatus.

11. A computer program product comprising a non-transitory computer readable storage medium having computer executable program code stored thereon, the computer executable program code comprising: code for broadcasting, by an apparatus, a synchronization signal configured to provide a timing reference for slave devices; code for broadcasting, by the apparatus, a discovery request packet with a given timing offset with relation to the timing reference, for reception by receptive slave devices that have matching timing with the given timing offset; code for receiving a response packet from each receptive slave device with the given timing offset; code for detecting a timing conflict in which the apparatus has simultaneously received two or more response packets, and responsively transmitting to the receptive slave devices a response change request packet, wherein the response change request packet is configured to request one or more of the receptive slave devices to cease sending response packets in response to a following discovery request packet sent with the given timing offset, and to change a timing offset for sending a response packet; and code for testing validity of received response packets with check sums to determine a timing conflict from a check sum error, wherein the synchronization signal is configured to energize the receptive slave devices.

12. The computer program product of claim 11, further comprising code for performing device discovery by varying the given timing offset so as to identify receptive slave devices with any of the successive timing offsets.

13. The computer program product of claim 11, further comprising code for broadcasting a mute command to cause an identified receptive slave device to become non-responsive to a future discovery request packet.

14. A computer program product comprising a non-transitory computer readable storage medium having computer executable program code stored thereon, the computer executable program code comprising: code for receiving, by an apparatus, a synchronization signal from a proximate transmitter unit, and to obtain a timing reference from the synchronization signal; code for receiving, by the apparatus, from the transmitter unit a discovery request packet with a given timing offset with relation to the timing reference, code for transmitting, by the apparatus, to the transmitter unit a response packet with the given timing offset; and code for receiving, by the apparatus, from the transmitter unit a response change request packet, and responsively to receiving of the response change request packet, abstaining from sending a response packet in response to a following discovery request packet received from the transmitter unit with the given timing offset, and changing a timing offset for sending a response packet, wherein the transmitter unit is configured to test validity of received response packets with check sums to determine a timing conflict from a check sum error, and wherein the synchronization signal is configured to energize the receptive slave devices.

15. The computer program product of claim 14, further comprising code for detecting radio impulses only if received during a sensitivity period of the apparatus.

* * * * *